3,276,860
PREPARATION OF FLUORSPAR
Mark Lintz, P.O. Box 672, Prescott, Ariz.
No Drawing. Filed Feb. 3, 1964, Ser. No. 342,240
4 Claims. (Cl. 75—55)

This invention relates in general to a method of preparing fluorspar for use as a flux in the melting of steel.

The function of fluorspar in the melting of steel is to make the slags fluid or thin, thus allowing the metals in the slag to separate easily. It is preferred to use highly concentrated $CaF_2$ such as a material approximately the naturally occurring but relatively scarce 97.5% $CaF_2$ "acid grade fluorspar." It is possible to concentrate relatively lower grades, naturally occurring material, but in the concentrating operation, a finely ground material of the order of 95% minus 200 mesh results. Thus, while a highly concentrated fluorspar is obtained which, in this respect, is an ideal flux, other difficulties are introduced, especially in the matter of the extremely fine nature of the product. Such fines are not readily melted into the metallurgical slags and are blown out of the furnaces.

It is therefore an object of this invention to provide a method permitting the use of relatively low grade fluorspars.

Another object of this invention is to provide a method of the foregoing type which makes available a highly concentrated fluorspar prepared from lower grade fluorspars but which eliminates the problem of handling during smelting fines of the type aforementioned.

Generally, this invention involves the forming of the eutectic of either sodium chloride, calcium chloride or magnesium chloride and concentrated fluorspar fines derived from relatively low grade fluorspars and continuing to heat to drive off most of the added chloride to form a more or less porous sinter. In the case of the most desirable of these alternatives involving the use of the relatively cheap sodium chloride, the eutectic forms at about 550° C. By contrast, calcium chloride melts at 1360° C.

More particularly, fluorspar fines of the type aforementioned are prepared by concentrating relatively low grade fluorspar to a minimum level of about 20% $CaF_2$ wetted with a solution of one of the aforementioned chlorides and the resulting damp mix is pressed into briquettes. No particular pressure is required to form the briquettes as an incompressible, wet, sandy mixture forms and this merely must be held in a given form and dried. The fluorspar concentrates may vary somewhat in screen size, with some concentrates being on the average of minus 100 mesh. Other ores require finer grinding and the resultant concentrates may average 200 mesh in screen size. The size may be dictated by the necessity of obtaining fines sizes sufficient to permit the surface tension of the wetted particles to hold the briquette portions together during the preliminary stages. The moisture added preferably ranges between 10–15% of the weight of the fines and within the range 7–18 weight percent, in any event. The salt is added in the water as a salt solution; the salt quantity may range between 1.5 and 5% and within the range 1–7 weight percent, in any event.

The relatively porous briquette obtained is heated to form the eutectic, and as the heating continues the sodium chloride or other chloride volatilizes (beginning at about 900° C. in the case of the sodium chloride), thus leaving a sintered fluorspar briquette with no dilution or impurities other than the original concentrate. The final heating temperature should reach at least about 1200° C. for at least about one-half hour and preferably at least about 1300° C. for one-half hour. A small amount of residual salt will not interfere with the utility of the briquette as a fluxing material. If no salt were present at all, during the early drying stages the sandy pure fluorspar concentrates would simply run loose to form a pile of sandy material. It is well to continue heating long enough to volatilize most of the salt added, for if much salt remains and the product is contacted with water, as where it stands outdoors in the rain, the rain water will dissolve the salt and the briquette will weather. Where most of the salt has been driven out of the briquette, the calcium fluoride is sintered adequately and the briquette is weatherproof.

*Example I*

1000 grams of fluorspar concentrates, to which have been added 100 grams of water containing 20 grams of salt, yielded a mix of 1000 grams of concentrates containing 10% moisture and 2% salt. This moist mix was molded to form briquettes and the briquettes were dried. The salt crystals, at this early stage, formed a temporary binding, and the briquettes could be handled and placed on pallets for the next stage. The briquettes were sintered. At about 820° C., the salt fused and began to dissolve the calcium fluoride to form the eutectic mixture as a thin film between the particles, thus giving strength to the briquette. At this point, absence of the salt would have resulted in the fluorspar concentrates running into a loose pile of sandy material, as aforementioned. At about 1300° C., or close to the 1320° C. melting point of the calcium fluoride, the particles became strongly sintered and were no longer held by the fused film as in the preliminary heating. Sintering was carried out for one-half hour.

*Example II*

A very finely ground material having an average screen analysis of minus 200 mesh containing some extremely fine particles was mixed with 15% moisture to wet it to a molding consistency and 1.5% sodium chloride was added in the form of a solution in 150 grams of water. After being dried, the briquette had sufficient strength to be advanced to the sintering pallets. The briquettes were sintered at about 1300° C. for one-half hour.

*Example III*

A mix of the type aforementioned was prepared using 3% sodium chloride and 1% water which was heated to 1100° C. The strength of the briquettes was not particularly good and it was probably held together primarily by the eutectic.

*Example IV*

In a further run, a 3% sodium chloride solution was added to the fines with 10% water and the briquettes formed were heated to 1325° C. for approximately one-half hour. There was sufficient sintering of the fluorspar to provide satisfactory strength.

*Example V*

A test along the lines of Example IV was repeated; a mix containing 5% sodium chloride was prepared together with 10% water and the mix was briquetted and sintered to 1320° C. for one-half hour, giving a self-sustaining briquette along the lines of that resulting from the run of Example IV.

The aforementioned procedure was repeated with 2.5% added salt, with 3.5% added salt, and with 5% added salt. The initial salt binding action was apparently similar throughout, excepting that the briquettes made with the 5% salt solution were somewhat more porous than the others aforementioned.

Mine fines run minus one-half inch in screen size and these cannot be bound with dried salt crystals. Rather, these fines must be ground to minus 100 mesh, thus making up an aggregate with a size range similar to concrete mixes. When wetted with 10% water and 2.5% salt, briquettes of good strength resulted from this coarse ground ore material.

Briquetting was done in each of the aforementioned examples on a standard briquetting press. Somewhat more practical is the extruding-type press which extrudes in square cross-section or circular cross-section.

Obviously, many modifications and variations of this invention may be made without departing from the spirit and scope thereof, and therefore only such limitations should be imposed as are indicated in the appended claims.

I claim:

1. A process for preparing fluorspar fines for use as fluxes comprising:
   (a) concentrating said fines to a minimum level of about 20% $CaF_2$;
   (b) moistening said fines with between about 7 and 18 weight percent water;
   (c) adding to the said fines between about 1 and 7 weight percent of a chloride selected from the class consisting of sodium chloride, calcium chloride and magnesium chloride;
   (d) forming briquettes of the foregoing mixture;
   (e) sintering the briquettes so formed to a temperature of at least about 1200° C. for a time sufficient to sinter said fluorspar and to drive off a substantial fraction of said chloride added.

2. The process of claim 1 wherein the chloride is sodium chloride.

3. The process of claim 1 wherein the sintering temperature is about 1320° C.

4. The process of claim 1 wherein the chloride is sodium chloride which is added in a quantity of about 3% based upon the weight of the fluorspar fines.

No references cited.

BENJAMIN HENKIN, *Primary Examiner*.